(No Model.)
J. R. FLINN.
NIPPLE CHUCK.
No. 584,996. Patented June 22, 1897.
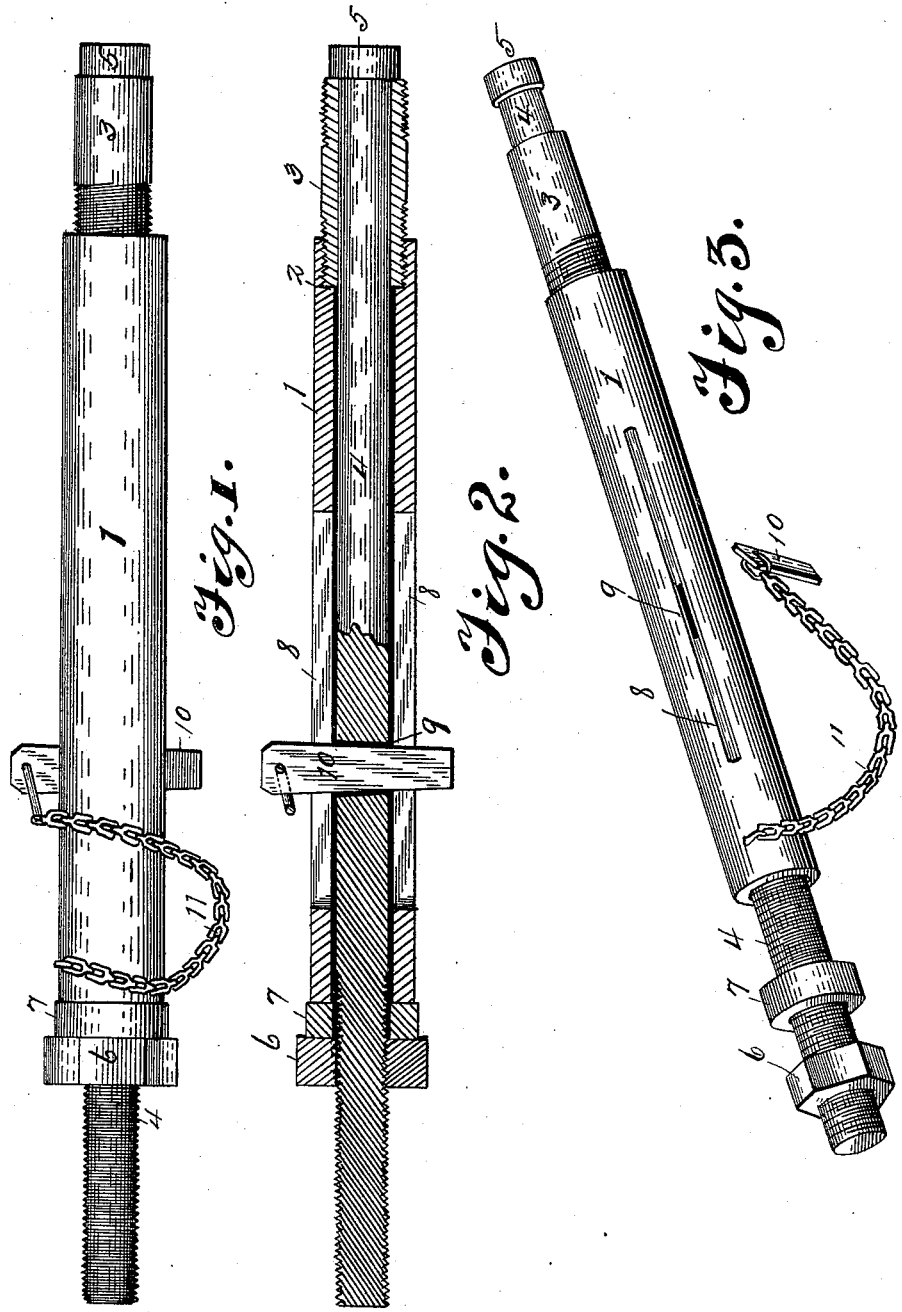
Witnesses
Frank H. Stright.
A. M. Wilson
Inventor
John R. Flinn.
By Henry C. Evert, Attorney

UNITED STATES PATENT OFFICE.

JOHN R. FLINN, OF JOHNSTOWN, PENNSYLVANIA.

NIPPLE-CHUCK.

SPECIFICATION forming part of Letters Patent No. 584,996, dated June 22, 1897.

Application filed February 24, 1897. Serial No. 624,754. (No model.)

*To all whom it may concern:*

Be it known that I, JOHN R. FLINN, a citizen of the United States of America, residing at Johnstown, in the county of Cambria and State of Pennsylvania, have invented certain new and useful Improvements in Nipple-Chucks, of which the following is a specification, reference being had therein to the accompanying drawings.

This invention relates to certain new and useful improvements in nipple-chucks, and has for its object to provide a chuck that will securely hold the nipple in the proper position while the thread is being cut upon one end of the same.

The invention aims to provide a chuck of this nature that may be adjusted to conform to the various lengths of the nipples, being readily changed to hold a nipple from one to six inches or longer in length.

The invention further aims to provide a chuck in which a nipple may be quickly placed and secured in position; furthermore, that will be extremely simple in construction, strong, durable, effectual in its operation, and comparatively inexpensive to manufacture.

The invention further resides in the novel construction, combination, and arrangement of parts to be hereinafter more specifically described and particularly pointed out in the claim.

In describing the invention in detail reference is had to the accompanying drawings, forming a part of this specification, and wherein like figures of reference indicate similar parts throughout the several views, in which—

Figure 1 is a side elevation of my improved nipple-chuck, showing the nipple in position for cutting the thread. Fig. 2 is a longitudinal sectional view of the same, showing the thread cut on the nipple. Fig. 3 is a perspective view of the chuck with the tightening-rod partly removed in position to remove the nipple from the chuck.

Referring now to the drawings by reference-figures, 1 denotes the body portion, which may be formed of a steel tubing, casting, or other suitable metal, and is provided with a shoulder 2 near the one end, this end being screw-threaded to receive the nipple 3. This nipple 3 is held in position by means of a fastening rod or bar 4, provided on its one end with a head 5, which engages against the nipple 3, and on its other end being screw-threaded to receive the securing-nut 6. A washer 7 may be placed on this screw-threaded end between the nut and the end of the body portion 1, if desired. This body portion is provided with slots 8 8, extending in alinement therewith, and the rod or bar 4 is provided with a slot 9, said slot receiving the wedge 10 to prevent the turning of the rod within the body portion. In order to have this wedge at hand at all times when needed, I attach the same by means of a chain 11 to the body portion, as is shown in the drawings.

It is thought that the operation of my improved nipple-chuck will be readily apparent from the views of the same that I have shown in the drawings, as it is of course understood that the thread on one end of the nipple is cut before the nipple is placed in the chuck. The nipple is then screwed into the chuck until the end of the nipple engages the shoulder 2, the bolt 4 being then inserted through the nipple and the body portion of the chuck with the head 5 engaging the outer end of the nipple. The nut 6 is then turned on the screw end of the rod in order to press the head 5 firmly against the outer end of the nipple and prevent the same from turning. This head 5, it will be observed, is slightly smaller in diameter than the diameter of the nipple, so that the die may readily cut the thread on the nipple without engaging the head of the bolt. The wedge 10 merely serves to prevent the bolt from turning within the body portion while the thread-cutting operation is being performed, and it will be observed that almost any sized nipple that is usually required may be easily accommodated in this chuck. In case small nipples are being cut the work may be expedited by inserting a sleeve on the screw-threaded end of the bolt between the washer 6 and the end of the body portion, thus obviating the necessity of turning the nut 6 to such an extent on the bolt in order to tighten the same.

It will be noted that various changes may be made in the details of construction without departing from the general spirit of my invention.

Having fully described my invention, what I claim as new, and desire to secure by Letters Patent, is—

In a nipple-chuck, the combination of the tube, having a shoulder formed therein and being screw-threaded to receive the nipple, a fastening-bolt provided with a head on one end to engage the outer end of the nipple, said tube and fastening-bolt being provided with slots to receive a wedge to prevent the bolt from turning and the opposite end of said fastening-bolt, being provided with a screw-thread to receive a tightening-nut, substantially as shown and described.

In testimony whereof I affix my signature in presence of two witnesses.

JOHN R. FLINN.

Witnesses:
 JOHN NOLAND,
 THOS. M. BOYD, Jr.